(12) United States Patent
Karliczek

(10) Patent No.: US 12,299,216 B2
(45) Date of Patent: May 13, 2025

(54) OPERATING DEVICE FOR A VEHICLE

(71) Applicant: BHTC GmbH, Lippstadt (DE)

(72) Inventor: Markus Karliczek, Lippstadt (DE)

(73) Assignee: BHTC GmbH, Lippstadt (DE)

( * ) Notice: Subject to any disclaimer, the term of this patent is extended or adjusted under 35 U.S.C. 154(b) by 0 days.

(21) Appl. No.: 18/710,487

(22) PCT Filed: Nov. 18, 2022

(86) PCT No.: PCT/EP2022/082423
§ 371 (c)(1),
(2) Date: May 15, 2024

(87) PCT Pub. No.: WO2023/089099
PCT Pub. Date: May 25, 2023

(65) Prior Publication Data
US 2025/0028399 A1    Jan. 23, 2025

(30) Foreign Application Priority Data
Nov. 22, 2021 (DE) ............ 10 2021 130 513.6

(51) Int. Cl.
G06F 3/0362    (2013.01)
G06F 3/039    (2013.01)
G06F 3/044    (2006.01)

(52) U.S. Cl.
CPC ......... *G06F 3/0362* (2013.01); *G06F 3/0393* (2019.05); *G06F 3/044* (2013.01)

(58) Field of Classification Search
CPC ....... G06F 3/0362; G06F 3/0393; G06F 3/044
See application file for complete search history.

(56) References Cited

U.S. PATENT DOCUMENTS 7,145,087 B1 * 12/2006 Su .................. H01H 19/11
                                              200/11 R
7,414,205 B1 *  8/2008 Heinrich ......... H01H 19/63
                                              200/336

(Continued)

FOREIGN PATENT DOCUMENTS

DE         19743283 C1    2/1999
DE    10-2006-036636 A1   2/2007

(Continued)

OTHER PUBLICATIONS

International Search Report for corresponding Patent Application No. PCT/EP2022/082423 dated Mar. 20, 2023.

*Primary Examiner* — Michael Pervan
(74) *Attorney, Agent, or Firm* — Christensen, Fonder, Dardi PLLC; Diane E. Bennett; Peter S. Dardi

(57) ABSTRACT

The operating device for a vehicle is provided with a capacitively operating touch panel (16) comprising an upper face with a touch-sensitive surface, and an operating unit comprising a movable operating element (22) which can the grasped manually and has an electrically conductive surface and a plate-shaped holding element provided with an upper face and a lower face (54) facing away from the upper face, on which holding element the operating element (22) is movably arranged and which in turn is arranged on the touch-sensitive surface of the upper face of the touch panel (16). The operating element (22) comprises at least one wiper electrically connected to its electrically conductive surface, which wiper slides along a sensing path (40) of the upper face of the holding element when the operating element (22) is moved. The holding element comprises alternately successive first sections (50) and second sections (52) along the sensing path (40). The upper and lower face (54) of the holding element are connected to each other in an (Continued)

Figure 1:
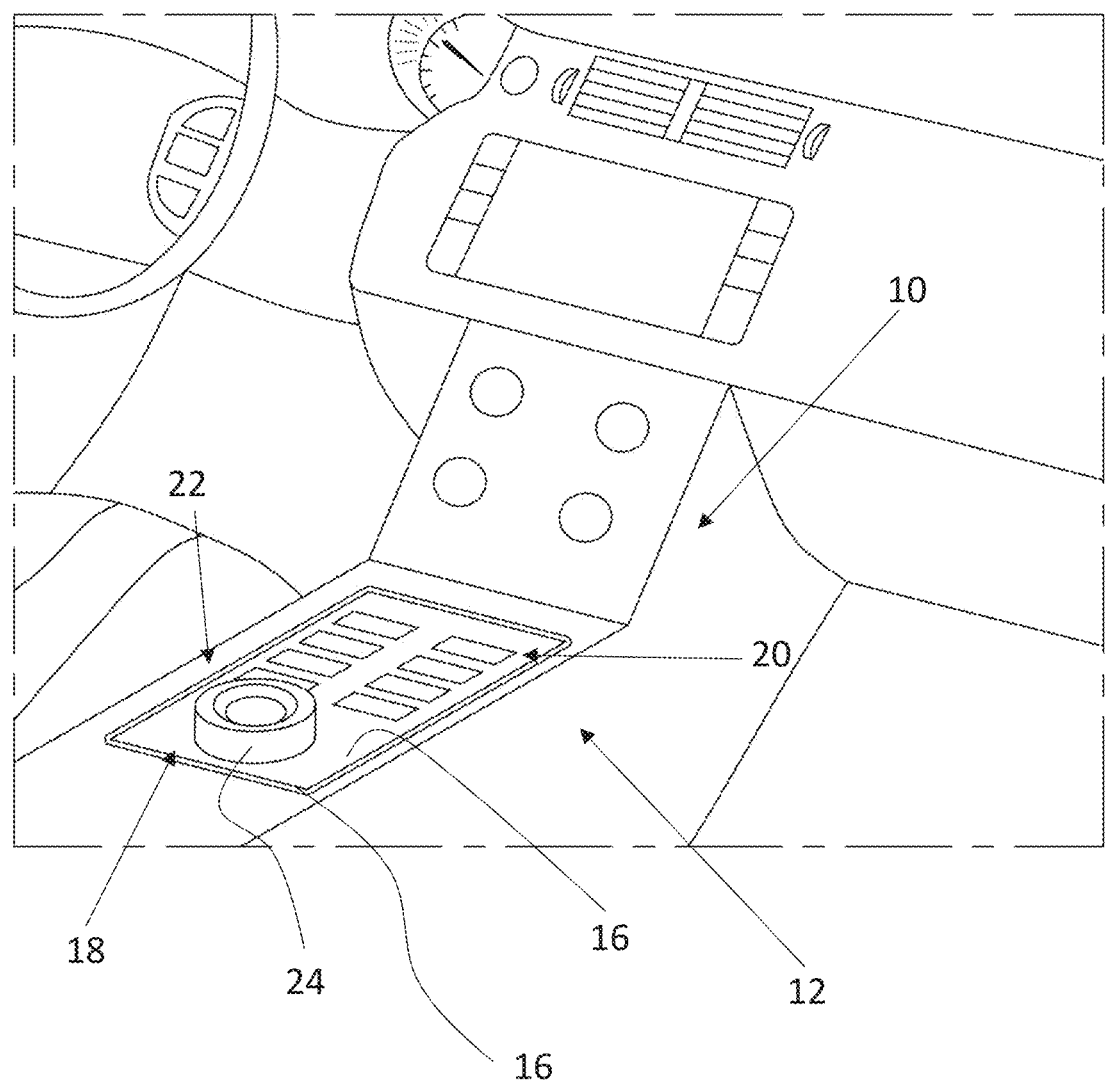

electrically conductive manner in each of the first sections (50) and are electrically insulated from each other in each of the second sections (52).

20 Claims, 12 Drawing Sheets

(56) References Cited

U.S. PATENT DOCUMENTS

| | | | | |
|---|---|---|---|---|
| 9,296,140 | B2* | 3/2016 | Harris | B29C 45/2673 |
| 9,692,261 | B2* | 6/2017 | Nemoto | H02K 21/14 |
| 9,922,784 | B2* | 3/2018 | Levay | B60K 35/80 |
| 10,754,451 | B2* | 8/2020 | Fischer | G05G 5/06 |
| 11,467,696 | B2* | 10/2022 | Korherr | G06F 3/03547 |
| 2008/0185272 | A1* | 8/2008 | Otani | B60K 35/10 |
| | | | | 200/318 |
| 2011/0061489 | A1* | 3/2011 | Bulin | G05G 1/12 |
| | | | | 74/553 |
| 2014/0042004 | A1* | 2/2014 | Tseng | G06F 3/0362 |
| | | | | 200/336 |
| 2017/0052617 | A1* | 2/2017 | Okuzumi | G06F 3/0362 |
| 2019/0391672 | A1* | 12/2019 | Fischer | G05G 5/06 |

FOREIGN PATENT DOCUMENTS

| | | |
|---|---|---|
| DE | 10-2006-043208 A1 | 3/2008 |
| DE | 10-2010-010574 A1 | 9/2011 |
| DE | 10-2011-007112 A1 | 10/2012 |
| DE | 10-2016-121076 A1 | 5/2018 |
| DE | 10-2018-118839 A1 | 2/2020 |
| DE | 10-2018-118809 A1 | 6/2020 |
| EP | 2302799 A2 | 3/2011 |
| EP | 3574393 A1 | 11/2020 |
| FR | 3056474 A1 | 3/2018 |
| WO | 2018-114138 A1 | 6/2018 |
| WO | 2018-137944 A1 | 8/2018 |

* cited by examiner

OPERATING DEVICE FOR A VEHICLE

CROSS REFERENCE TO RELATED APPLICATIONS

The present application is a National Stage filing of PCT application No. PCT/EP2022/082423 filed Nov. 18, 2022, entitled "Operating Device For A Vehicle", which claims the priority of the German Patent Application 10 2021 130 513.6 of Nov. 22, 2021, the content of which is hereby incorporated by reference into the subject matter of the present application.

The invention relates to an operating device for a vehicle, wherein the operating device comprises a typically capacitively operating touch panel with a correspondingly touch-sensitive surface on which an operating unit with an operating element is arranged, which can be grasped manually and can be moved in a translatory and/or rotary manner in a direction parallel to the upper face of the touch panel and can be moved automatically reversibly orthogonally to the upper face of the touch panel, i.e. can be depressed.

Touch panels and in particular touch screens have become increasingly popular as operating devices for vehicles in recent years. However, it is sometimes more convenient to enter operating commands using operating elements which can be grasped manually and are designed as a slider or rotary adjuster with a push function.

The combination of manually actuatable operating elements with touch panels or touch screens has already been described on various occasions. Examples of this are described in DE-C-197 43 283, DE-A-10 2006 043 208, DE-A-10 2010 010 574, DE-A-10 2011 007 112 and EP-A-2 302 799. In the known operating devices, an encoder element coupled to the operating element moves on the touch-sensitive surface of the touch panel in order to use its touch sensor system to determine the current movement position of the operating element. It is sometimes desirable for the user to be able to position the operating element selectively at various positions of the touch panel. Encoder elements that move of the surface of the touch panel can cause damage and wear of the touch-sensitive surface of the touch panel (scratches, abrasive marks, etc.) which should be avoided.

From WO-A-2018/137944 an operating device for a motor vehicle is known, in which a ring or a disk is arranged between the rotatable operating element and the touch panel, which ring or disk has alternately electrically conductive and electrically non-conductive areas along a circular line. Said circular line is traversed by means of a wiper when the operating element is twisted, which wiper is electrically conductive and is connected to the surface of the control element in an electrically conductive manner, which surface in turn is also electrically conductive. When the operating element is touched, a capacitive coupling between the lower face of the holding element (in the area of its conductive sections) and the touch panel is created. This in turn can be used to detect the rotary position of the operating element by means of the touch sensor system of the touch panel. In addition, the known operating element can also be depressed, wherein additional electrical/capacitive couplings are created between the operating element and the touch panel in the depressed state, which couplings can be used to detect that the operating element has been pressed.

Thus, the known operating device comprises several elements that should be able to be mounted expediently in a simple manner. In addition, such an operating element should also have a corresponding haptics. Said haptics functionality is typically realized by a wiper or a spring element, but in the prior art these are realized by elements provided separately from the detection wipers. This increases the assembly effort.

From DE-A-10 2006 036 638 a latching mans for a rotary/push operating element of a vehicle is known, in which a component with two spring functions is used for the exclusively mechanically acting functions of reversible depression and twisting. None of the spring arms (for the depression function) and spring tongues (for latching when twisting) used for this purpose has an electrical function.

Further rotary/push adjusters that are arranged on a touch-sensitive surface are described in DE-A-10 2016 121 076, DE-A-102018118809, DE-A-10 2018 118 839 and WO-A-2018/114138.

It is an object of the present invention to further simplify the structure and assembly of an operating device of the type mentioned at the beginning.

The object of the present invention is achieved with the invention proposing an operating device for a vehicle, provided with
- a capacitively operating touch panel having a touch-sensitive upper face,
- an operating unit having an operating element which can be grasped manually and has an electrically conductive surface, and having a holding element which is provided with an upper face and a lower face facing away from the upper face and on which the operating element is arranged so as to be movable in a translatory and/or rotatory manner in a direction parallel to the upper face of the touch panel and orthogonally to the upper face of the touch panel,
- wherein the operating element comprises at least one motion detection encoder element electrically connected to the electrically conductive surface of the operating element preferably in the form of a wiper sliding along a sensing path of the holding element when the operating element is moved
- wherein the holding element comprises alternately successive first sections and second sections along the sensing path,
- wherein the upper and lower face of the holding element are connected to each other in an electrically conductive manner in each of the first sections and are electrically insulated from each other in each of the second sections,
- wherein the operating unit comprises a latching means having at least one elastic latching element and a latching path with alternately successively arranged latching protrusions and latching recesses,
- wherein the sensing path of the operating unit is configured as a sensing patch of the latching means and comprises the latching protrusions and the latching recesses, wherein the at least one latching element also serves as a motion detection encoder element,
- wherein the operating element of the operating unit is reversibly depressible towards the holding element and comprises at least one push detection encoder element electrically connected to the electrically conductive surface of the operating element, which, in the depressed state of the operating element, makes electrically conductive contact with at least one of the first sections of the sensing path of the operating unit, which section electrically connects the upper face of the holding element to the lower face thereof, irrespective of its movement position, and is arranged at a distance from the sensing path of the operating unit in the non-depressed state of the operating element, and an electrically conductive spring element comprising a support element connected to the surface of the operating element in an electrically conductive manner, from which at least one first spring arm serving as the motion detection encoder element and the latching element, at least one second spring arm serving as the push detection encoder element, and at least one third spring arm serving as a return spring for the reversible return movement of the operating element after depressing the same protrude, wherein the three spring arms are integrally formed with the common support element.

The operating device according to the invention comprises a capacitively operating touch panel on the touch-sensitive upper face on which a holding element for the rotary and/or translatory mounting of an operating element is arranged. The operating element is part of an operating unit and comprises an electrically conductive surface. The operating element can not only be moved in a translatory and/or rotary manner but can also be depressed reversibly.

A sensing means having a latching path, which has alternately successively arranged latching elevations and latching recesses, is used for haptics when the operating element is twisted or displaced in a translatory manner. Said latching path is sensed by an elastic latching element, which is discussed below. The latching path is also used for electrical sensing by an electrically conductive motion detection encoder element, which is typically designed as a wiper and thus also assumes the function of the latching element. The latching path comprises electrically conductive and electrically non-conductive sections which are alternately successively arranged, allowing the upper face of the latching path to be electrically connected to the lower face of the holding element in the electrically conductive sections.

In addition to the motion detection encoder element, the operating unit also comprises a push detection encoder element, which is also designed to be electrically conductive and, like the motion detection encoder element, is connected to the surface of the operating element in an electrically conductive manner. In the non-depressed state, the push detection encoder element does not contact the sensing path; this rather only occurs when the operating element is in a depressed state. The two aforementioned detection encoder elements are arranged offset to one another so that in each rotational or displacement position of the operating element when it is depressed, the push detection encoder element in any case contacts another electrically conductive section of the sensing path than is the case for the motion detection encoder element. Alternatively, in the depressed state of the operating element, the push detection encoder element can contact extensions connected to the first and second sections of the sensing path, which are alternately electrically conductive to the lower face of the holding element.

Thus, different touch-sensitive areas of the touch panel respond in each movement position of the operating element, allowing the movement position of the operating element to be detected. If the operating element is now pushed in a movement position, the push detection encoder element comes into contact with at least one of the electrically conductive sections, so that a signal is now generated at a further sensitive point on the touch panel. Expediently, several push detection encoder elements are provided whose position relative to each other is known. If signals are now received via the touch panel from, for example, three different locations that are positioned relative to each other in the same way as the push detection encoder elements, this can be interpreted as the operating element assuming the depressed position.

According to the invention, the two types of detection encoder elements and at least one return spring for realizing the reversible depressibility of the operating element are integral components of one and the same electrically conductive spring element. For this purpose, said spring element comprises a support element electrically connected to the surface of the operating element, from which support element spring arms protrude. Thus, the support element comprises at least one first spring arm which acts as a motion detection encoder element and latching element and with which the sensing path, which is designed as a latching path, is therefore swept over when the operating element is moved in a translatory or rotatory manner. Furthermore, at least one second spring arm protrudes from the support element, which assumes the function of the push detection encoder element and only comes into contact with the sensing path when the operating element is pressed. Finally, the support element also comprises a third spring arm assuming the function of the return spring for the reversible return movement of the operating element after being depressed.

This concentration of electrical and haptic functions of the operating unit in a single spring element makes it easy to assemble and manufacture the operating unit. The number of components to be installed is reduced accordingly, which benefits both the manufacturing and assembly process.

In an expedient embodiment of the invention it may be provided that the support element of the spring element is connected to the operating element and can be moved along with the operating element during its rotary and/or translatory movement and movement orthogonal thereto, and that the operating element has a supporting surface for the third spring arm on which the third spring arm abuts and in relation to which the operating element is movable when being depressed. The support element and thus the spring element is hence moved along with the operating element. A supporting surface for the at least one third spring arm is located on the operating element, on which supporting surface the at least one third spring arm abuts and in relation to which the at least one third spring arm moves. The operating element can thus be moved orthogonally to the upper face of the touch panel on a component that is moved along by the operating element during rotary and/or translatory movement and can be depressed relative to the operating element. Said component then comprises the supporting surface for the at least one third spring arm or supporting surfaces for each third spring arm, on which the respective spring arm can preferably slide along.

It is advantageous if special designs of the support element and of the operating element can also be used to realize a push haptics. For this purpose, according to a first variant in an advantageous embodiment of the invention, it is proposed that the supporting surface comprises a protrusion over which the third spring arm slides when the operating element is depressed, and/or a recess into which the third spring arm plunges when the operating element is depressed. This means that in addition to its return spring function, the third spring arm also assumes the function of realizing the push haptics.

As a variant for realizing the push haptics, it may be provided in an advantageous further development of the invention that the second spring arm comprises a deflecting protrusion or a deflecting recess, wherein the second spring arm is reversibly deformable by the deflecting protrusion or by the deflecting recess when the operating element is depressed, thus creating a mechanical resistance to be overcome manually when the sensing path is contacted in order to reach the depressed position of the operating element. The at least one second spring arm or each second spring arm, which initially assumes the function of a push detection encoder element, now also serves to build up mechanical resistance when the operating element is depressed, thus creating the push haptics.

In an alternative embodiment of the aforementioned concept, it is advantageously provided that a deflecting protrusion or a deflecting recess for the or each second spring arm is formed along the sensing path of the operating unit, wherein the second spring arm is reversibly deformable by the deflecting protrusion or by the deflecting recess when the operating element is depressed, and thus, when contacting the sensing path or with extensions connected to the first and second sections of the sensing path, which, like the first and second sections of the sensing path, are alternately electrically connected to the lower face of the holding element, a mechanical resistance to be overcome manually in order to reach the depressed position of the operating element is created.

Here, it is also the second spring arm that additionally provides the push haptics. Unlike before, however, this is not achieved by a special shaping of the second spring arm or each second spring arm, but by a shaping on the sensing path, which has a lateral deflecting protrusion or a lateral deflecting recess along its extension. In all four of the aforementioned cases, there is always a reversible bending of the at least one second spring arm or of each second spring arm shortly before the operating element reaches the depressed position, which causes a mechanical resistance to build up that is overcome when the operating element is depressed.

In a further expedient embodiment of the invention, it may be provided that the sensing path has a surface facing parallel to the upper face of the touch panel or a surface that is oriented orthogonally to the upper face of the touch panel. This means that in the case of a rotary adjuster, the wave-shaped sensing path is oriented radially (parallel to the upper face of the touch panel) or axially (orthogonal to the upper face of the touch panel). Thus, the elongated "valleys" of the sensing path extend either parallel to the upper face of the touch panel or perpendicular thereto. Basically, the sensing path is either linear (if the operating element is designed as a slider) or in the form of a ring or circular segment (in the case of a fully rotatable or only partially rotatable operating element).

It is also expedient if several such spring arms are arranged to be evenly distributed, in particular with regard to the third spring arm serving as a return spring. In the case of a depressible rotary adjuster or rotary knob or rotary ring, it is advantageous if the third spring arms are offset to one another by 120°. However, similar considerations equally apply to the first and second spring arms. Each of said spring arm groups consisting of first or second or third spring arms should comprise spring arms which are arranged in an evenly distributed manner. This serves on the one hand to ensure that the operating element is depressed in a tilt-proof manner and on the other hand to equalize the forces that the individual spring arms also apply to the operating element.

In another embodiment of the invention it is provided the second spring arm comprises a contact end for contacting the sensing path when the operating element is depressed, wherein the contact element has a dimension which is greater than the extension of the first and second sections when viewed in the extension of the succession of the first and second sections. This ensures than each second spring arm in any case comes into electrical contact with one of the electrically conductive first sections of the sensing path and is thus capacitively coupled to the touch panel when the operating element is depressed.

It can also be advantageous if the operating element comprises at least two motion detection encoder elements arranged offset to one another along the sensing path and thus comprises at least two first spring arms, wherein the offset between two of the motion detection encoder elements or between two of the first spring arms extends across a length equal to the extension of successive first and second sections with either an even number of first sections and an uneven number of second sections or with an uneven number of first sections and an even number of second sections, wherein one of said two motion detection encoder elements or one of said two first spring arms contacts a first section of the sensing path in each movement position of the operating element.

Typically, it is advantageous if the operating element comprises at least two push detection encoder elements arranged offset along the sensing path and thus comprising at least two second spring arms, wherein at least one of said two push detection encoder elements or at least one of said two second spring arms contacts a first section of the sensing path in each movement position of the operating element.

In another embodiment of the invention it can provided that the offset between the said two push detection encoder elements or between the said two second spring arms extends across a length equal to the extension of successive first and second sections with either an even number of first sections and an uneven number of second sections or an uneven number of first sections and an even number of second sections.

It is also advantageous if each first and second section of the holding element arranged along the sensing path extends from the center of a latching recess to the center of an adjacent latching recess or from the center of a latching elevation to the center of an adjacent latching elevation.

In another advantageous embodiment of the invention it is provided that the operating element is formed as a depressible slider or a depressible rotary adjuster (e.g. rotary ring or rotary knob). The operating element can be an open or closed rotary/push adjuster, for example, which in its design as a ring in the interior allows a view on the touch panel so that information displayed there becomes visible, as is the case with a touch screen, or which in a closed design can have its own display device, for example.

Furthermore, it is advantageous if the touch panel is formed as a part of a touch screen or as a capacitively operating touch pad or as a capacitively operating touch film.

It is also advantageous if there is a force feedback functionality optionally in conjunction with a force sense functionality of the touch panel of the operating element.

Another advantageous embodiment of the invention is that the holding element is at least partially arranged on the touch-sensitive surface of the upper face of the touch panel, wherein, in each movement position of the operating element, at least one of the motion detection encoder elements or at least one of the first spring arms and at least one of the push detection encoder elements or at least one of the second spring arms is positioned in that region of the upper face of the holding element below which the touch-sensitive surface of the upper face of the touch panel is located.

Furthermore, it is advantageous if in each movement position of the operating element at least two of the motion detection encoder elements or at least two of the first spring arms and at least one of the push detection encoder elements or at least one of the second spring arms are positioned in that region of the upper face of the holding element below which the touch-sensitive surface of the upper face of the touch panel is located.

Finally, another embodiment of the invention provides that the operating unit is arranged immovably on the upper face of the touch panel, or that the operating unit is displaceable on the upper face of the touch panel (e.g. by a magnetic holder of the operating unit or a mechanical holder solution with the possibility of displacement).

Figure 2:
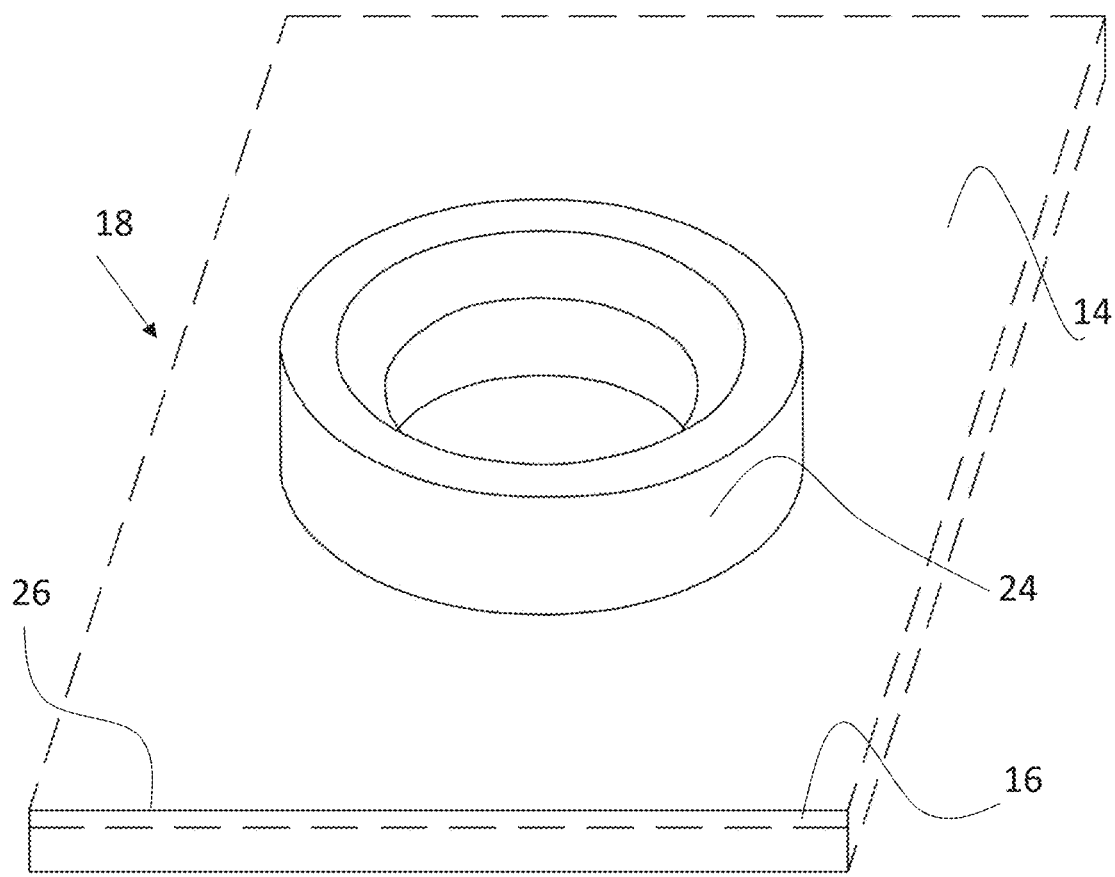
Figure 3:
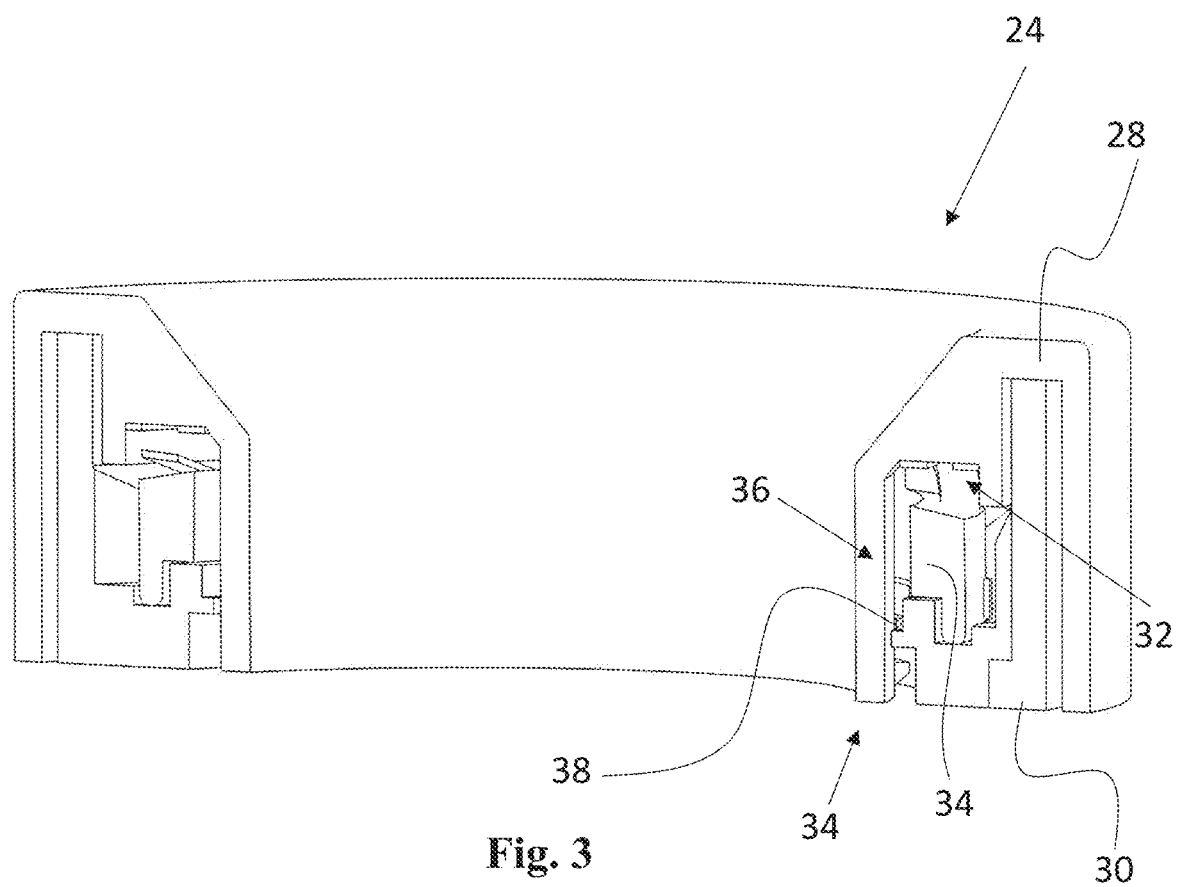
Figure 4:
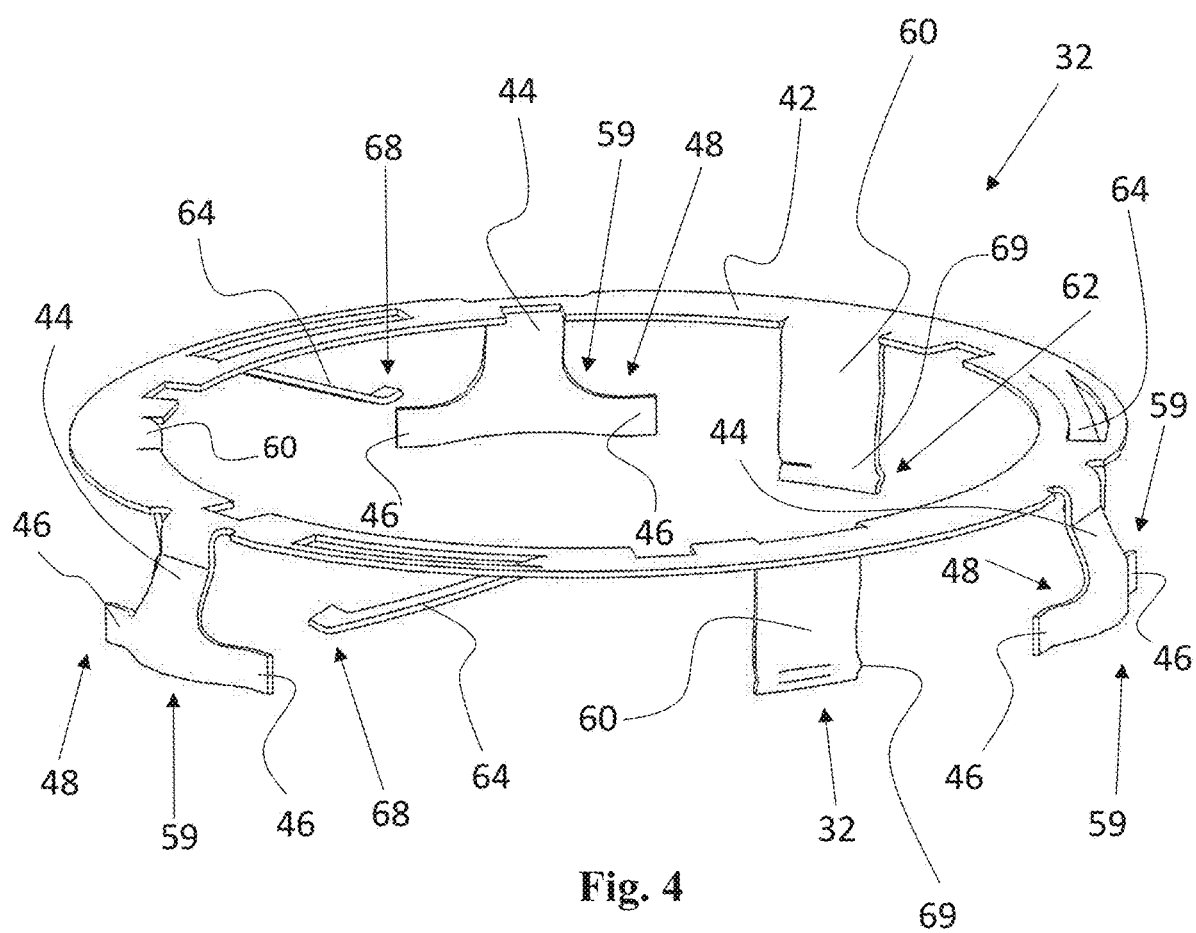
Figure 5:
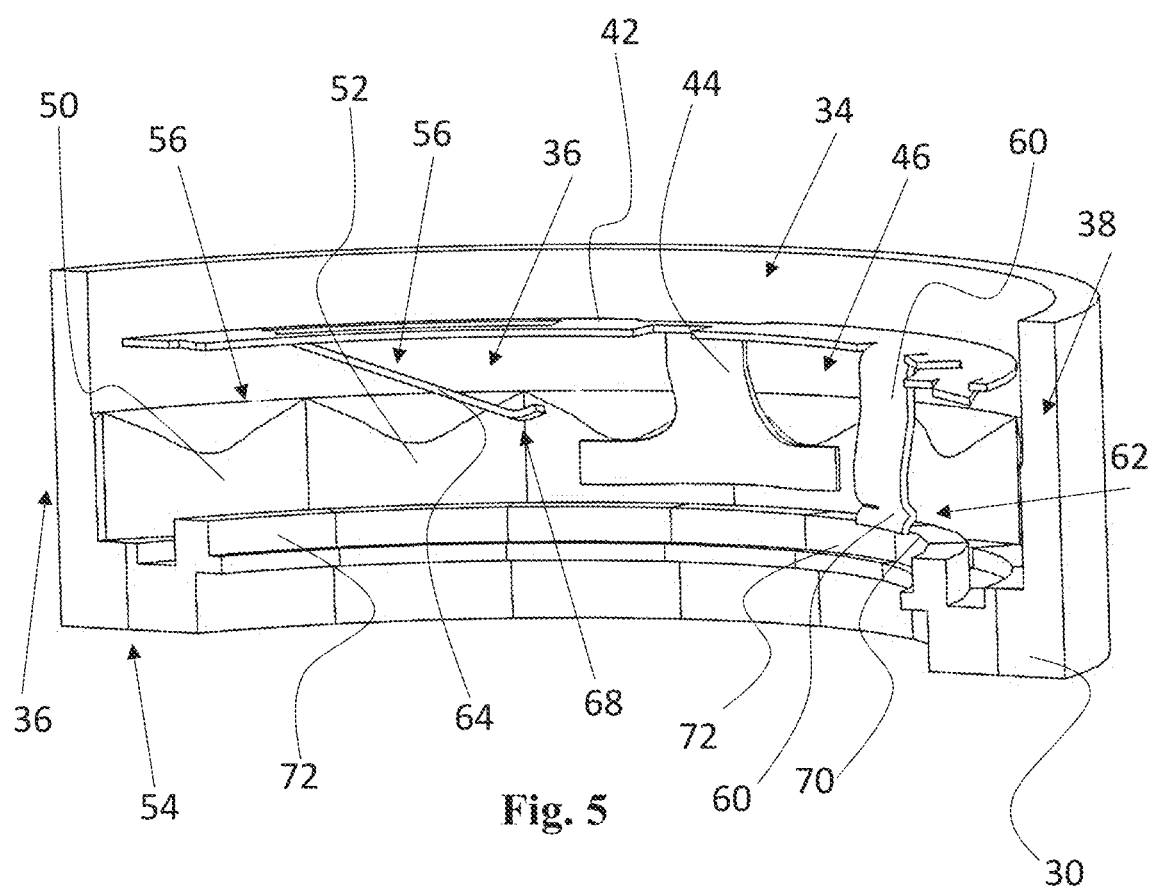
Figure 6:
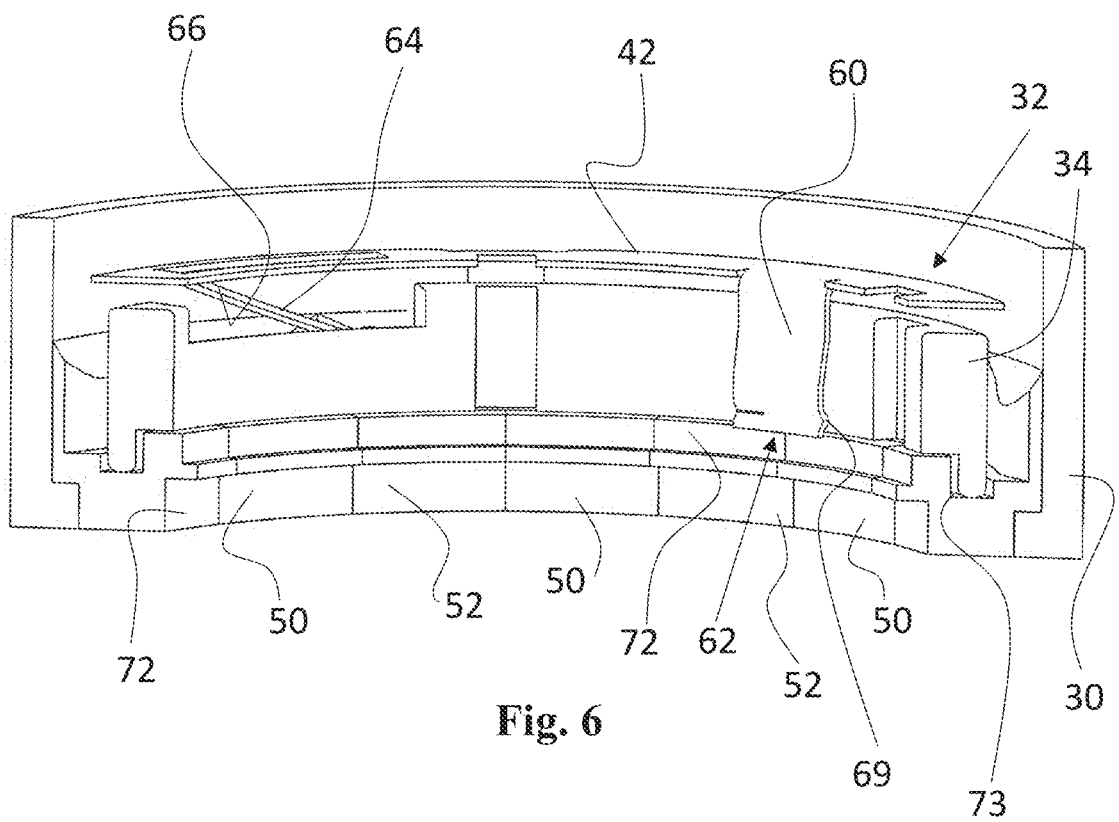
Figure 7:
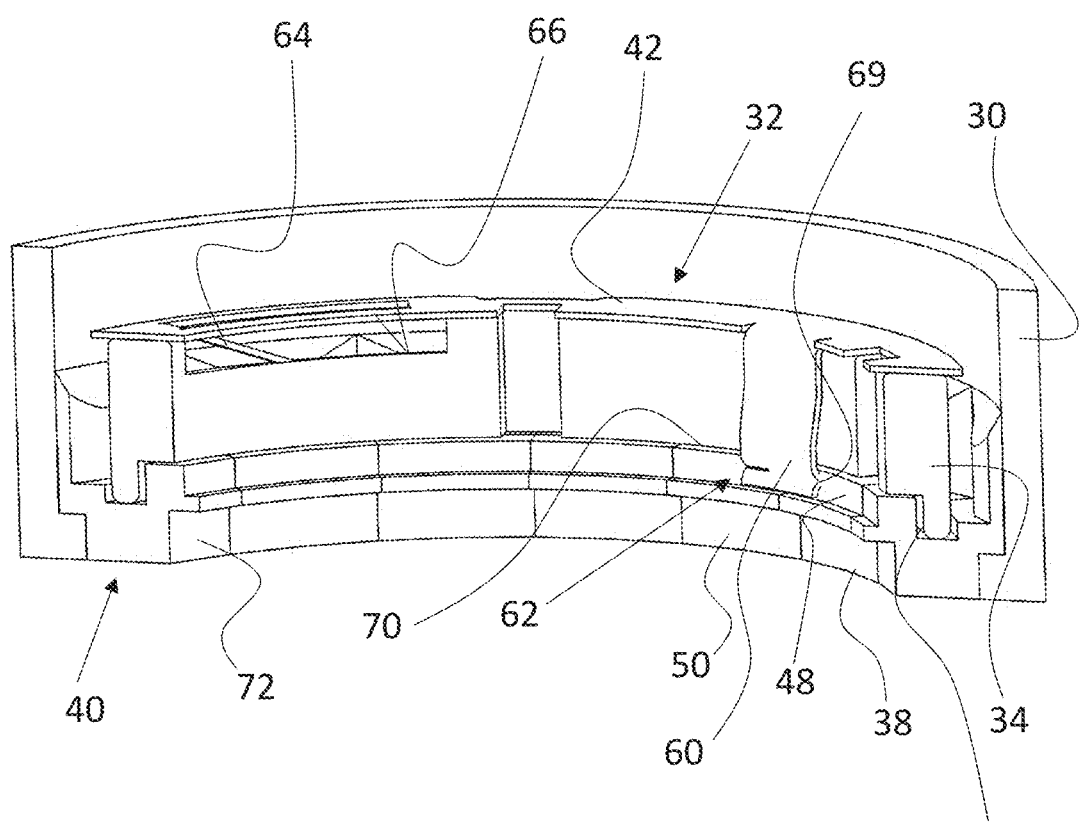
Figure 8:
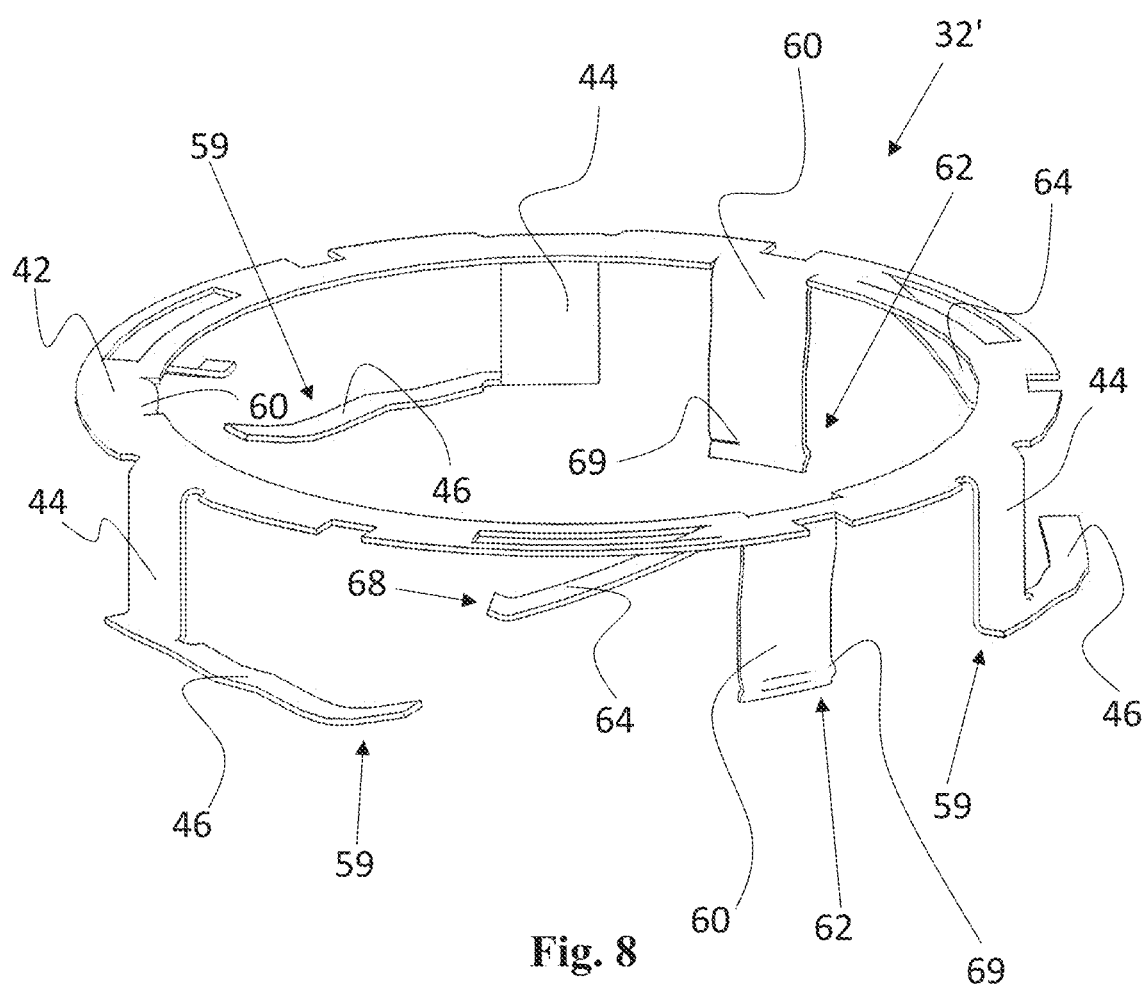
Figure 9:
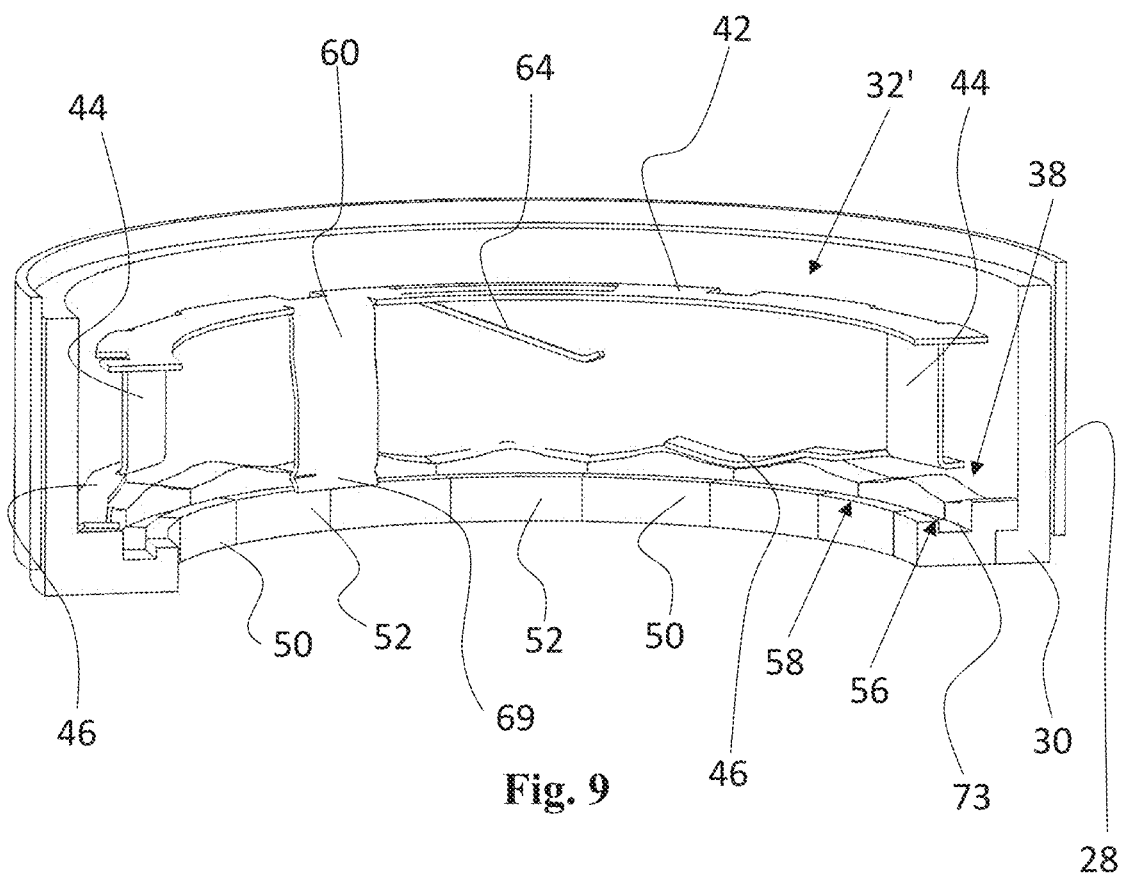
Figure 10:
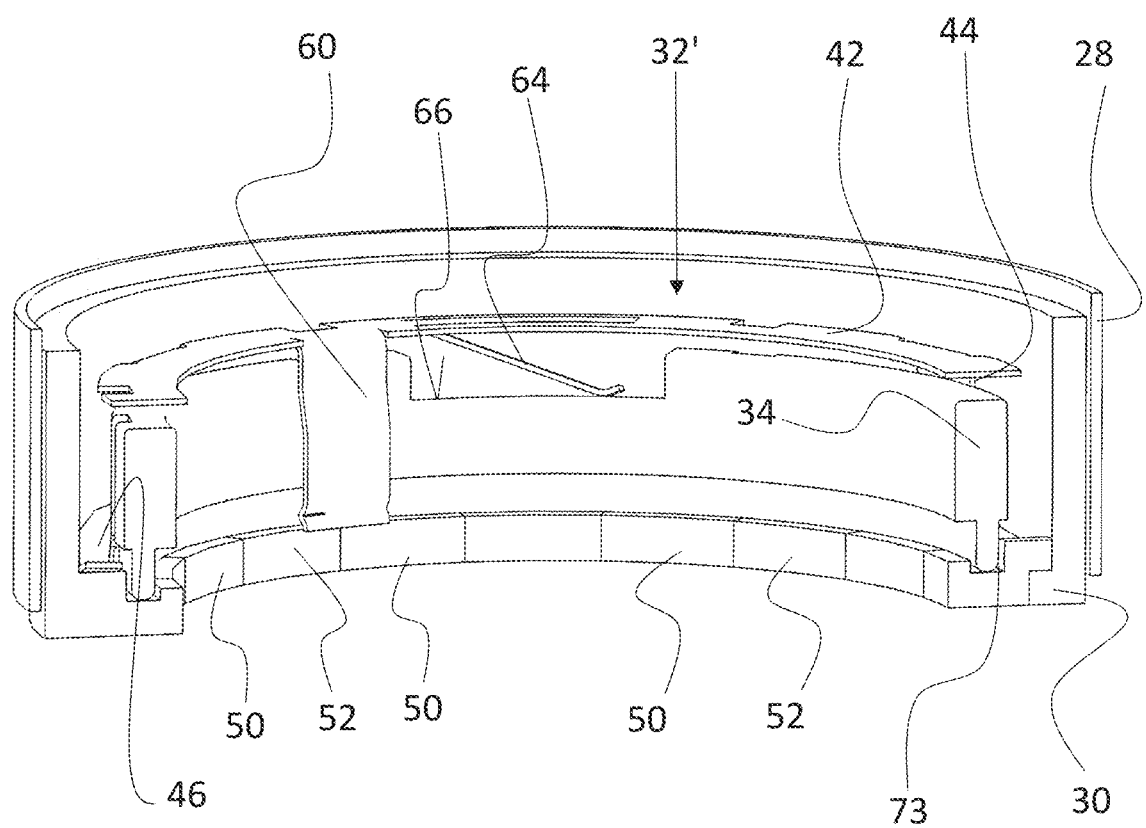
Figure 11:
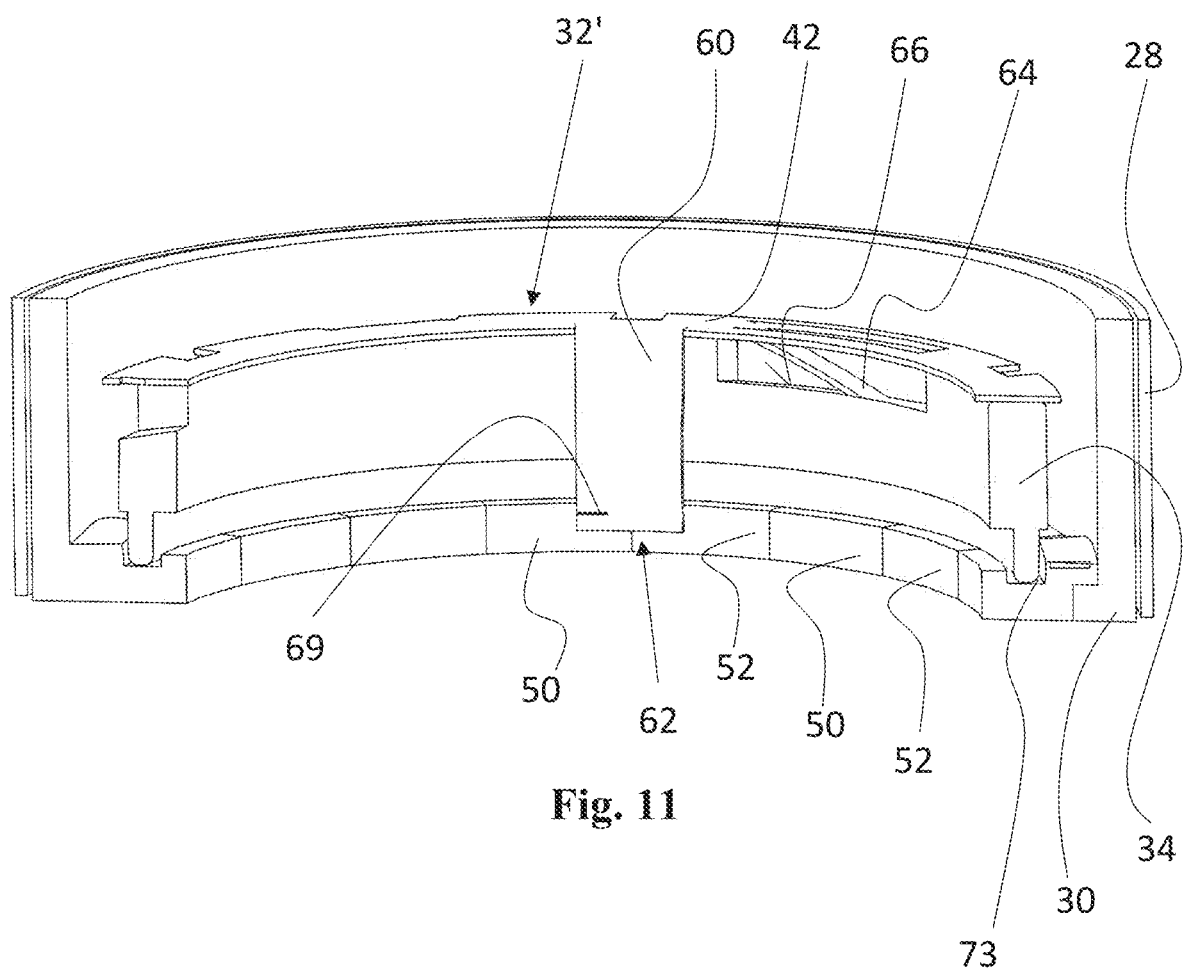
Figure 12:
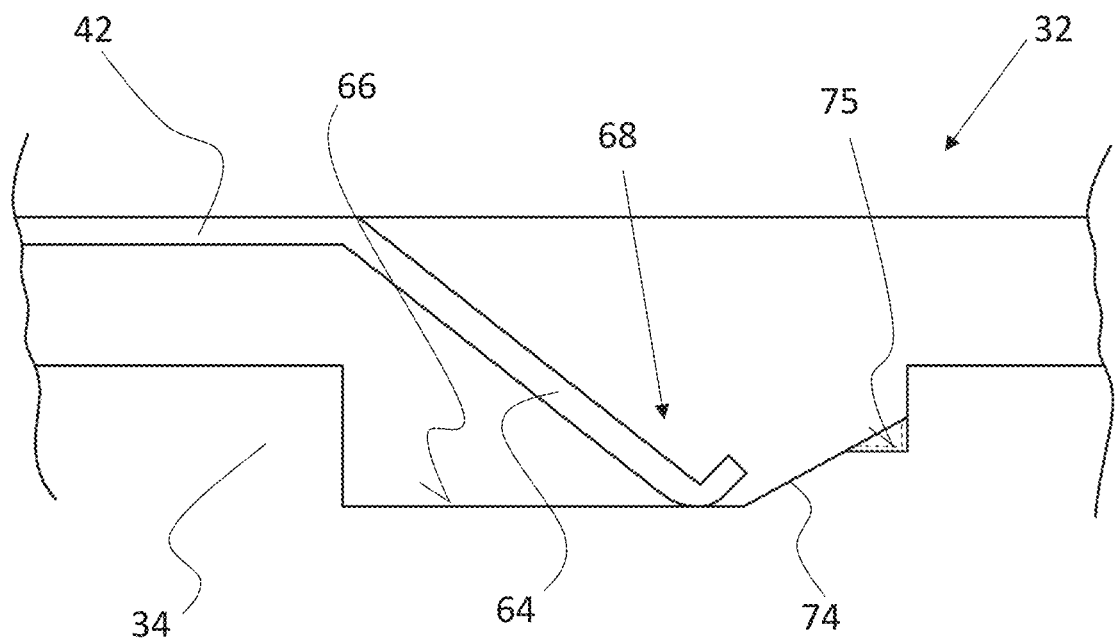
Figure 13:
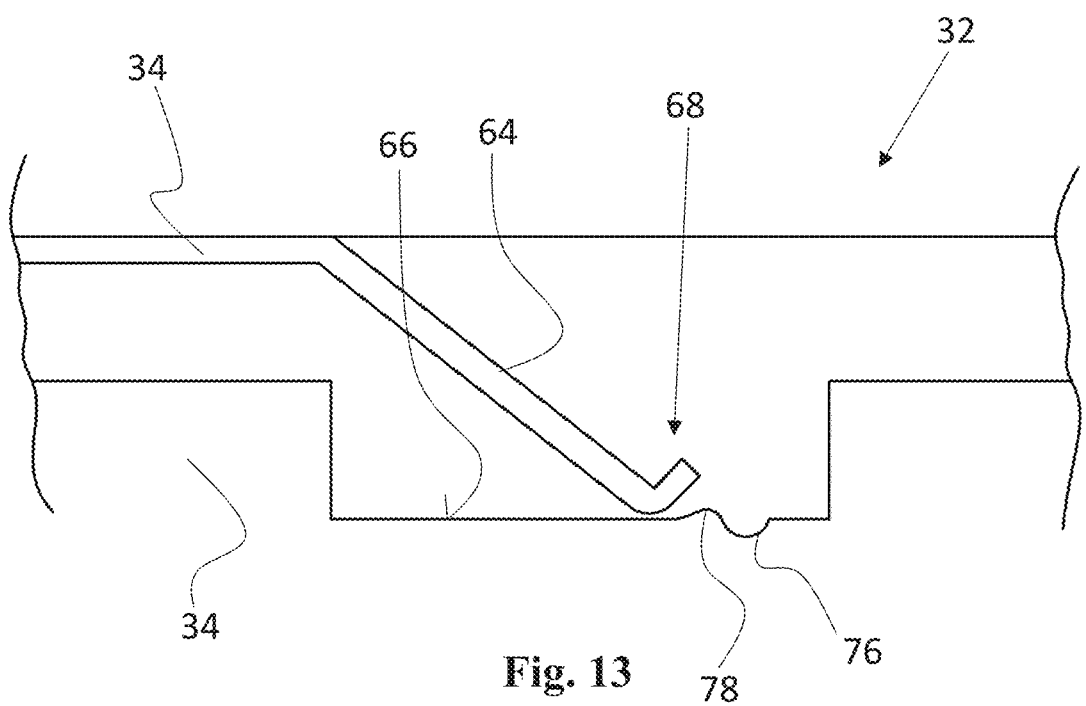

In the following, exemplary embodiments of the invention are explained in detail by means of the drawing. In detail, the Figures show:

FIG. 1 shows a view of the center console and the central part of the instrument panel of a vehicle with an operating device according to the invention, FIG. 2 shows a perspective view of the operating element of the operating device on the touch-sensitive touch panel, FIG. 3 shows a section through the operating element, FIG. 4 shows an illustration of the multifunctional spring element according to a first exemplary embodiment, FIG. 5 shows a partially broken illustration of the operating element with the spring element according to FIG. 4 in the assembled state and when the operating element is not depressed, FIG. 6 shows an illustration similar to FIG. 5, wherein additionally a component coupled to the operating element is illustrated as a counter bearing for the return spring of the spring element, namely also in the non-depressed state of the operating element, FIG. 7 shows the illustration according to FIG. 6 in the depressed state of the operating element, FIG. 8 shows an illustration of the multifunctional spring element according to a second exemplary embodiment, FIG. 9 shows a partially broken illustration of the operating element with the spring element according to FIG. 8 in the assembled state and when the operating element is not depressed, FIG. 10 shows an illustration similar to FIG. 9, wherein additionally a component coupled to the operating element is illustrated as a counter bearing for the return spring of the spring element, namely also in the non-depressed state of the operating element, FIG. 11 shows the illustration according to FIG. 10 in the depressed state of the operating element, and FIGS. 12 and 13 show two alternatives for realizing a push haptics by the return spring, while the push haptics is realized in the exemplary embodiments of FIGS. 4 to 11 by a special configuration of the push encoder element in combination with a particular design of the sensing or latching patch.

FIG. 1 shows a perspective view of the area around center console 10 of a vehicle. The center console 10 is provided with an operating device 12 having a touch screen 14 with a touch panel 16 and an operating unit 18 according to the invention arranged on the touchscreen 14. Various buttons are shown at 20, which are displayed on touch screen 14.

In this exemplary embodiment, operating unit 18 has an annular rotary/push adjuster 24 as an operating element 22, of which several exemplary embodiments are described below.

FIG. 2 again shows in a perspective view how rotary/push adjuster 24 is arranged on the upper face of touch screen 14.

The touch panel 16 comprises a capacitively operating touch sensor system 26 which is used for spatially resolved position detection of elements of operating unit 18 which, as described below, are capacitively coupled to touch sensor system 26 of touch panel 16 as a function of the twisting position and the pressing position of rotary/push adjuster 24.

FIG. 3 shows a section through rotary/push adjuster 24. The rotary/push adjuster 24 comprises an operating ring 28 consisting of electrically conducting material or coated with electrically conductive material. The operating ring 28 is mounted on a holding element 30, which is also annular, so that it can be both rotated and pressed. A multifunctional spring element 32 and a further component 34, which is substantially ring-shaped and, like spring element 32, rotates with operating ring 28 when the latter is twisted, are coupled to operating ring 28 in a torque-proof manner. When depressing operating ring 28, the latter moves axially relative to the further component 34 on which supporting surfaces are formed for return springs to automatically return operating ring 28 after depressing the same. These details are discussed below.

A further component of holding element 30 is a part of a latching means 36, which has a latching path 38, but which at the same time also serves as a sensing path 40, which is used for the twist detection and push detection of the rotary/push adjuster 24, which will also be discussed below.

With reference to FIGS. 4 to 7, a first exemplary embodiment of the invention is described.

FIG. 4 shows the multifunctional spring element 32. Said spring element 32 consists of electrically conductive material or is coated with such a material and comprises a support element 42 designed as a ring in this exemplary embodiment. Three first spring arms 44 protrude from support element 42, at the ends of which wiper-like extensions 46 are arranged. Each first spring arm 44 acts together with the extensions 46 as a motion detection encoder element 48 in that, as illustrated for example in FIG. 5, each motion detection encoder element 48 slides along sensing path 40 with the extensions 46. The sensing path 40 comprises first sections 50 and second sections 52 which are alternately successively arranged and are arranged in a protruding manner on the inside of holding element 30, i.e. along the inside of its circumferential wall. The first sections 50 are electrically conductive and extend up to lower face 54 of holding element 30 with which the entire operating unit 18 rests on the upper face of touch screen 16. The second sections 52 are electrically non-conductive. The sections 50 and 52 are each designed as latching protrusions 56 of latching path 38, which accordingly has latching recesses 58 between respectively adjacent latching protrusions. If operating ring 28 is now twisted, the motion detection encoder elements 48 wipe along sensing path 40, which is designed as a latching path 38, wherein they contact at least one electrically conductive first section 50 of the sensing path 40 in each twisting position. The electrically conductive multifunctional spring element 32 is in turn electrically connected to operating ring 28, so that when operating ring 28 is grasped manually, a capacitive coupling of the motion detection encoder elements 48 with the touch screen 16 occurs, as is the case when the touch screen is touched with a finger of a hand, for example. In addition to the electrical detection function, the motion detection encoder elements 48 also operate as latching elements 59 of latching means 36.

As can be seen from FIG. 4, said multifunctional spring element 32 has three second spring arms 60 which have contact ends 62 at their ends, via which each of the three second spring arms 60 comes into contact with sensing patch 40 when operating ring 28 is pressed. FIGS. 5 and 6 show the situation in which the operating ring 28 is not pressed. The contact ends 62 of the second spring arms 60 are located above the individual sections 50, 52 of sensing path 40. When operating ring 28 is depressed, the situation as shown in FIG. 7 occurs, in which each second spring arm 60 contacts two adjacent first and second sections 50, 52 of sensing path 40. This results in a further capacitive coupling with touch screen 16 in the pressed state, but at points other than those at which capacitive couplings are already occurring due to the currently assumed twisting position of operating ring 28. The number and position of the individual points on the touch screen or the touch panel at which the capacitive coupling and thus "touch" detection occurs when operating ring 28 is pressed and when it is not pressed are different from one another, which makes it possible to distinguish whether operating ring 28 is pressed in addition to the currently assumed twisting position or not.

The automatic return movement of operating ring 28 after being depressed is also realized with the aid of the multifunctional spring element 32, which in this exemplary embodiment has three third spring arms 64 for this purpose, which, like the other spring arms 44 and 60, protrude from support element 42. Said third spring arms 64 are supported on supporting surfaces 66 on the additional component 34, relative to which the multifunctional spring element 32 can be depressed axially and together with which the multifunctional spring element 32 twists when operating ring 28 is rotated.

FIG. 6 describes the situation in which operating ring 26 is not pressed. The multifunctional spring element 32 has a distance to component 34 that is substantially the same as the extent to which operating ring 28 is depressed. When operating ring 28 is depressed, the curved ends 68 of the third spring arms 64 slide along on the supporting surfaces 66 assigned thereto. This causes the third spring arms 64 to be tensioned during depression and thus build up the force or store the energy required to move operating ring 28 back to the initial position after depression.

Now that the electrical functions of the multifunctional spring element 32 and its return function have been described for the first exemplary embodiment, the haptic functions are discussed below. As already mentioned above, the motion detection encoder elements 48 also serve as latching elements 59, which interact with latching path 38 in a latching manner. This realizes the rotary haptics by using the same elements that are used for motion detection.

The push haptics with snap function is realized, for example, by a special shaping of the contact ends 62 of the second spring arms 60 (see the beads 69) in combination with a deflecting edge or a deflecting protrusion 70 on latching path 38 or on the extensions 72 of the first and second sections 50, 52 of sensing path 40, which, among other things, also serve to guide the additional component 34 (see guiding groove 73 in which component 34 is plunged) and to connect it to lower face 54 of holding element 30. This situation is shown in FIGS. 6 and 7. In the depressed position of operating ring 28 according to FIG. 7, contact end 62 of each second spring arm 60 is forcibly deflected. The forced deflection creates an additional mechanical resistance that must be overcome when operating ring 28 is depressed and realizes the snap function.

Alternatively, the push haptics with snap function could also be realized by a special surface structure of the supporting surfaces 66, as shown in FIGS. 12 and 13. According to FIG. 12, it is provided for this purpose that end 68 of each third spring arm 64 is pushed onto a bevel 74 or raised above bevel 74 to a plateau 65 (shown in FIG. 12 by a dashed line) when operating ring 28 assumes the depressed position. Alternatively or additionally, however, each third spring arm 64 can also be plunged with its end 68 in a recess 76 of supporting surface 66 when operating ring 28 is in its depressed position. If necessary, an elevation 78 can be arranged in front of recess 76 or a recess can be omitted in front of such an elevation. The edge steepness of bevel 74 or elevation 78 and, if present, the degree to which they slope have an effect on the snap effect.

When operating ring 28 is depressed, it is necessary to "work" manually against the force of the third spring arm 64. Towards the end of the depression movement, a snap effect occurs in the form of increased resistance to be overcome, possibly followed by a sudden drop in resistance.

As described above, the multifunctional spring element 32 thus fulfills a plurality of functions which can be realized by the different spring arms. These functions include the two electrical detection encoder functions for the rotary and the push position as well as two and, in a special variant, three mechanical functions, namely the rotary haptics by the latching device with the wave-shaped (wiper) ends on the first spring arms 44, the push haptics by the third spring arms 64, which are mechanically tensioned during depression, and the snap function in the final phase of depression by the previously described alternatives of shaping of the contact ends 62 of the second spring arms 60, and/or the different variants of the design of the supporting surfaces 66, on which the ends 68 of the third spring arms 64 slide along when operating element 22 of rotary/push adjuster 24 is depressed. A single component therefore serves several purposes and realizes several features (electrical and mechanical) of the operating device according to the invention, which is advantageous in terms of manufacture and assembly.

FIGS. 8 to 11 shows a further exemplary embodiment of a multifunctional spring element 32'. In FIGS. 8 to 11, those reference numerals which show parts of the same construction or function as those in FIGS. 4 to 7 are designated by the same reference numerals as used in these latter figures.

The main difference between the two embodiments according to FIGS. 4 to 7 on the one hand and FIGS. 8 to 11 on the other hand is to be seen in the fact that the orientation of the latching or sensing path in the exemplary embodiment of FIGS. 4 to 7 is circumferentially axial, whereas the sensing or latching path in the exemplary embodiment of FIGS. 8 to 11 is radially oriented. Accordingly, in the exemplary embodiment of FIGS. 8 to 11, the sensing or latching path is not located on the inside of the circumferential wall of holding element 30, but on a flange-like inner protrusion of holding element 30. Thus, the orientation of the contact ends 62 of the first spring arms 44 in the exemplary embodiment according to FIGS. 8 to 11 is twisted by 90° compared to the situation in the exemplary embodiment of FIGS. 4 to 7.

LIST OF REFERENCE NUMERALS 10 center console
12 operating device
14 touch screen
16 touch panel
18 entire operating unit
20 buttons on the touch screen
22 operating element
24 annular rotary/push adjuster 26 capacitively operating touch sensor system
28 operating ring
30 holding element
32 multifunctional spring element
32' multifunctional spring element
34 additional component
36 latching means
38 latching path of latching means
40 sensing path
42 support element
44 first spring arms
46 extensions
48 motion detection encoder element
50 first sections of sensing path
52 second sections of sensing path
54 lower face of holding element
56 latching protrusions of latching path
58 latching recesses of latching path
59 latching element of latching means
60 second spring arms
62 contact ends of second spring arms
64 third spring arms
66 supporting surfaces on component
68 curved ends of third spring arms
69 beadings in the contact ends of the second spring arms
70 deflecting protrusion on the sensing path
72 extensions
73 guiding groove for the component
74 bevel on the supporting surface
75 plateau
76 recess on the supporting surface
78 elevation

The invention claimed is:

1. An operating device for a vehicle, comprising
a capacitively operating touch panel (16) having a touch-sensitive upper face,
an operating unit (18) having an operating element (22) which can be grasped manually and has an electrically conductive surface, and having a holding element (30) which is provided with an upper face and a lower face (54) facing away from the upper face and on which the operating element (22) is arranged so as to be movable in a translatory and/or rotatory manner in a direction parallel to the upper face of the touch panel (16) and orthogonally to the upper face of the touch panel (16),
wherein the operating element (22) comprises at least one motion detection encoder element (48) electrically connected to the electrically conductive surface of the operating element (22),
wherein the holding element (30) comprises alternately successive first sections (50) and second sections (52) along the sensing path (40),
wherein the upper and lower face (54) of the holding element (30) are connected to each other in an electrically conductive manner in each of the first sections (50) and are electrically insulated from each other in each of the second sections (52),
wherein the operating unit (18) comprises a latching means (36) having at least one elastic latching element (59) and a latching path (38) with alternately successively arranged latching protrusions and latching recesses (58),
wherein the sensing path (40) of the operating unit (18) is configured as a latching path (38) of the latching means (36) and comprises the latching protrusions and the latching recesses (58), wherein the at least one latching element (59) also serves as a motion detection encoder element (48),
wherein the operating element (22) of the operating unit (18) is reversibly depressible towards the holding element (30) and comprises at least one push detection encoder element electrically connected to the electrically conductive surface of the operating element (22), which, in the depressed state of the operating element (22), makes electrically conductive contact with at least one of the first sections of the sensing path (40) of the operating unit (18), irrespective of its movement position, and is arranged at a distance from the sensing path (40) of the operating unit (18) in the non-depressed state of the operating element (22), and
an electrically conductive spring element (32) comprising a support element (42) connected to the surface of the operating element (22) in an electrically conductive manner, from which at least one first spring arm (44) serving as the motion detection encoder element (48) and the latching element (59), at least one second spring arm (60) serving as the push detection encoder element, and at least one third spring arm (64) serving as a return spring for the reversible return movement of the operating element (22) after depressing the same protrude,
wherein the three spring arms (44, 60, 64) are integrally formed with the common support element (42).

2. The operating device according to claim 1, characterized in that the support element (42) of the spring element (32) is connected to the operating element (22) and can be moved along with the operating element (22) during its rotary and/or translatory movement and movement orthogonal thereto, and in that the operating element (22) has a supporting surface (66) for the third spring arm (64) on which the third spring arm (64) abuts and in relation to which the operating element (22) is movable when being depressed.

3. The operating device according to claim 2, characterized in that the third spring arm (64) slides on the supporting surface (66) when the operating element (22) is depressed.

4. The operating device according to claim 3, characterized in that the supporting surface (66) comprises a protrusion over which the third spring arm (64) slides when the operating element (22) is depressed, and/or a recess (76) into which the third spring arm (64) plunges when the operating element (22) is depressed.

5. The operating device according to claim 2- or 3, characterized in that the second spring arm (60) comprises a deflecting protrusion or a deflecting recess, wherein the second spring arm (60) is reversibly deformable by the deflecting protrusion or by the deflecting recess when the operating element (22) is depressed, thus creating a mechanical resistance to be overcome manually when the sensing path (40) is contacted in order to reach the depressed position of the operating element (22).

6. The operating device according to claim 2- or 3, characterized in that a deflecting protrusion or a deflecting recess for the second spring arm (60) is formed along the sensing path (40) of the operating unit (18), wherein the second spring arm (60) is reversibly deformable by the deflecting protrusion or by the deflecting recess when the operating element (22) is depressed, and thus, when contacting the sensing path (40) or with extensions (72) connected to the first and second sections (50, 52) of the sensing path (40), which, like the first and second sections (50, 52) of the sensing path (40), are alternately electrically connected to the lower face of the holding element (30), a mechanical resistance to be overcome manually in order to reach the depressed position of the operating element (22) is created.

7. The operating device according to claim 1, characterized in that the sensing path (40) has a surface facing parallel to the upper face of the touch panel (16) or a surface oriented orthogonally to the upper face of the touch panel (16).

8. The operating device according to claim 1, characterized in that a plurality of, for example three, third spring arms (64) protrude from the support element (42) of the spring element (32) for depressing the operating element (22) in a tilt-proof manner.

9. The operating device according to claim 1, characterized in that the second spring arm (60) comprises a contact end (62) for contacting the sensing path (40) when the operating element (22) is depressed, wherein the contact element has a dimension which is greater than the extension of the first and second sections (50, 52) when viewed in the extension of the succession of the first and second sections (50, 52).

10. The operating device according to claim 1, characterized in that the operating element (22) comprises at least two motion detection encoder elements (48) arranged offset to one another along the sensing path (40) and thus comprises at least two first spring arms (44), wherein the offset between two of the motion detection encoder elements (48) or between two of the first spring arms (44) extends across a length equal to the extension of successive first and second sections (50, 52) with either an even number of first sections (50) and an uneven number of second sections (52) or with an uneven number of first sections (50) and an even number of second sections (52), wherein one of said two motion detection encoder elements (48) or one of said two first spring arms (44) contacts a first section (50) of the sensing path (40) in each movement position of the operating element (22).

11. The operating device according claim 1, characterized in that the operating element (22) comprises at least two push detection encoder elements arranged offset along the sensing path (40) and thus comprising at least two second spring arms (60), wherein at least one of said two push detection encoder elements or at least one of said two second spring arms (60) contacts a first section of the sensing path (40) in each movement position of the operating element (22).

12. The operating device according to claim 11, characterized in that the offset between the said two push detection encoder elements or between said two second spring arms (60) extends across a length equal to the extension of successive first and second sections (50, 52) with either an even number of first section (50) and an uneven number of second sections (52) or an uneven number of first sections (50) and an even number of second sections (52).

13. The operating device according to claim 1, characterized in that each first and second section (50, 52) of the holding element (30) arranged along the sensing path (40) extends from the center of a latching recess (58) to the center of an adjacent latching recess (58) or from the center of a latching elevation to the center of an adjacent latching elevation.

14. The operating device according to claim 1, characterized in that the operating element (22) is formed as a depressible slider or a depressible rotary adjuster.

15. The operating device according to claim 1, characterized in that the touch panel (16) is formed as a part of a touch screen or as a capacitively operating touch pad or as a capacitively operating touch film.

16. The operating device according to claim 1, characterized by a force feedback functionality optionally in combination with a force sense functionality of the touch panel (16) of the operating element (22).

17. The operating device according to claim 1, characterized in that the holding element (30) is at least partially arranged on the touch-sensitive surface of the upper face of the touch panel (16), wherein, in each movement position of the operating element (22), at least one of the motion detection encoder elements (48) or at least one of the first spring arms (44) and at least one of the push detection encoder elements or at least one of the second spring arms (60) is positioned in that region of the upper face of the holding element (30) below which the touch-sensitive surface of the upper face of the touch panel (16) is located.

18. The operating device according to claim 17, characterized in that, in each movement position of the operating element (22), at least two of the motion detection encoder elements (48) or at least two of the first spring arms (44) and at least one of the push detection encoder elements or at least one of the second spring arms (60) are positioned in that region of the upper face of the holding element (30) below which the touch-sensitive surface of the upper face of the touch panel (16) is located.

19. The operating device according to claim 1, characterized in that the operating unit (18) is arranged immovably on the upper face of the touch panel (16), or in that the operating unit (18) is displaceable on the upper face of the touch panel (16).

20. The operating device according to claim 1, characterized in that the at least one motion detection encoder element (48) is in the form of a wiper sliding along a sensing path (40) of the holding element (30) when the operating element (22) is moved.

* * * * *